3,118,730
ACIDIC PHOSPHATIC SOLUTIONS
John D. Nickerson, Lakeland, Fla., assignor to International Minerals & Chemical Corporation, a corporation of New York
No Drawing. Filed Oct. 14, 1959, Ser. No. 846,229
11 Claims. (Cl. 23—165)

This invention generally relates to acidic phosphatic solutions. More particularly the invention relates to the prevention of the precipitation of solid impurities from solutions of inorganic, acidic phosphatic materials such as those formed by the aqueous leaching of acidulated phosphate rock.

In conventional methods for the production of aqueous solutions of inorganic, acidic phosphatic materials, the reaction product which results from reacting phosphate rock with sulfuric acid is water leached to yield a crude aqueous acidic phosphatic solution product in which is suspended a substantial quantity of solid impurities. This crude aqueous solution product is usually the so-called wet process phosphoric acid of commerce.

The problems occasioned by suspended solid impurities are particularly acute with respect to wet process phosphoric acid. Conventional practice yields a crude wet process phosphoric acid containing about 15% to about 30% by weight of phosphorus pentoxide ($P_2O_5$) and a substantial portion of suspended solid impurities which do not readily settle. Such crude, dilute wet process acid is normally concentrated to increase the $P_2O_5$ content to at least about 45% by weight and more frequently to at least 50% by weight. The resultant concentrated acid is usually very dark, sometimes almost black, in color. The concentration procedure necessarily also serves to proportionately increase the quantity of suspended solid impurities and yields concentrated acid solutions frequently containing from about 15% to about 30% by volume of suspended solids which are particularly difficult to remove from the solution.

In general, it has been determined that the impurities present in wet process acidic phosphatic solutions, such as wet process phosphoric acid, comprise calcium sulfate hemihydrate ($CaSO_4 \cdot \frac{1}{2} H_2O$), sodium and potassium silicofluoride, iron and aluminum phosphates and, in acidic solutions resulting from concentration or other procedures in which organic materials are introduced in small amounts, double salts of iron and aluminum phosphates with phosphoric acids bearing organic substituents which may hypothetically be represented by the formula $RPO_4 \cdot 2H_3PO_4$, where "R" is an organic radical derived from the organic material employed in the production of the particular phosphate solution treated. There may also be other organic matter present.

Upon standing in storage or during shipment in tank cars or the like, such acidic phosphatic solutions deposit a layer of solid matter which renders handling of the stored or shipped acid exceedingly difficult and frequently economically unfeasible. Some solids and color may be removed from the crude solution by filtration. However, the concentrated acid is very viscous and difficult to filter and, further, the solids are of such a nature that they readily plug the filter and the solids are also difficult to remove from the filter. Further, even when the acid is filtered, upon standing solids form in the solution and settle out, thereby producing the same problem again. The solids which subsequently form in the solution and settle out of the solution are usually termed post-precipitated solids, and the mechanism is termed post-precipitation.

The prior art also teaches methods other than filtration for removing the solids from the acidic inorganic phosphatic solutions. These other prior art methods usually contemplate the addition of a material to the phosphatic solution to increase the rate of settling or precipitation of the solids. The precipitated solids are then removed by decantation or filtration. The filtration or decantation, however, is an additional process step which adds to the cost of the process. Further, the phosphatic solutions must frequently be held quiescent for relatively long periods of time to settle the solids to thereby produce a clarified supernatant solution. Also, many of the prior art methods do not remedy the problem of the post-precipitated solids, that is, after the initial clarification additional solids form in the solution and precipitate.

It is accordingly an object of the present invention to provide acidic phosphatic solutions in which the amount of solids precipitated is considerably reduced.

It is a further object of the invention to provide wet process phosphoric acid and similar solutions of acidic inorganic phosphatic materials in which the amount of solids precipitated is significantly decreased.

It is an additional object of the invention to provide a wet process phosphoric acid which may be shipped or stored over an extended time period.

It is a more specific object of the invention to provide a process which entails the utilization of only non-corrosive, non-fume forming agents for the stabilization of wet process phosphoric acid.

These and other objects and advantages of the present invention will be apparent from the specification.

Now, in accordance with this invention, it has been discovered that the amount of solids precipitated from solutions of acidic inorganic phosphates is significantly reduced when a chelating agent is present in the solution. The chelating agent is employed in minor proportions effective to decrease the amount of solids precipitated.

The chelating or stabilizing agents used are those having the characteristic of forming metal complexes at a pH below 7. The invention contemplates the utilization as stabilizing agents of individually or essentially pure compounds and mixtures thereof as well as materials containing these substances. Preferred chelating agents are the amino-polycarboxylic acids, salts and chelates. The term chelating agent as used herein is intended to refer to alkali, alkaline earth and heavy metal salts which conventionally form a chelate ring structure.

Preferred amino-polycarboxylic acids contemplated by this invention include ethylene diamine tetraacetic acid (EDTA), diethylene triamine penta-acetic acid (DTPA), N-hydroxyethyl ethylene diamine triacetic acid (HEEDTA), and N,N¹-dihydroxyethyl ethylene diamine triacetic acid and alkali metal salts thereof, especially the sodium salts thereof. Such compounds are well-known chelating or sequestering agents. Tetra sodium ethylene diamine tetra-acetic acid ($Na_4EDTA$) is illustrative of an alkali metal salt contemplated by this invention.

Preferred chelates selected from alkaline earth and heavy metal salts of amino polycarboxylic acids include ferric disodium ethylene diamine tetraacetic acid ($FeNa_2EDTA$), monosodium ferrous N-hydroxy ethyl ethylene diamine triacetic acid ($NaFeHEEDTA$), magnesium disodium ethylene diamine tetraacetic acid ($MgNa_2EDTA$), etc.

The exact reason why the chelating agents are effective in reducing the amount of solids precipitated from aqueous acidic inorganic phosphatic solutions has not been definitely established. One theory is that these chelating agents form complexes with calcium sulfate compounds and iron and aluminum phosphates. It is not intended, however, that the invention be limited to or by this theory.

The chelating agents are effective to some degree in substantially all proportions such that the relative amounts thereof utilized do not constitute an essential feature of the invention. In general, the amount of solids precipitated varies inversely with the amount of chelating agent utilized, that is, when more chelating agent is added to the acidic phosphatic solution, the amount of solids precipitated is reduced. The practical upper limit of chelating agent concentration is determined to a significant extent by economic considerations including reagent cost, cost of separation of precipitated solids from the clarified acidic solution, and dilution of the solution treated. Also, since the chelating agent remains in the acidic phosphatic solution, the upper limit is dictated to some extent by the maximum concentration of the chelating agent that can be tolerated in the acidic phosphatic solution. Normally, chelating agents are employed in a minor proportion requisite to provide from about 0.5 to about 50 pounds and preferably from about 1 to about 30 pounds of chelating agent per ton of acidic solution to be stabilized.

The chelating agents may tend to form agglomerates or lumps when mixed with strong acids. Accordingly, conventional expedients to effect uniform dispersion of the chelating agent in the acidic phosphatic solution with minimum formation of large particles are appropriately utilized. Such expenditures include, inter alia, relatively slow addition of the chelating agent to the acidic solution treated accompanied by vigorous agitation. The chelating agent is preferably in solution and, therefore, it is preferable to make up a solution of the chelating agent and to add the solution to the acidic phosphatic solution.

The mixing of the chelating agent and the acidic phosphatic solution may be under any desired temperature conditions. Hence, the invention generally contemplates stabilization of acidic phosphatic solutions at all temperatures as which the chelating agent is stable. Generally, lower temperatures increase the viscosity of the solution with consequent reduction in the settling rate.

The chelating agent is effective in stabilizing acidic phosphatic solutions of all concentrations. Acidic phosphate solutions formed by the leaching of phosphate rock may constitute substantially calcium-free phosphoric acid, or, depending upon the degree of acidulation, approach monocalcium phosphate solutions characterized by a $CaO/P_2O_5$ mole ratio of about 1:1. The invention is useful in the reduction of the amount of solids precipitated in all such solutions and more specifically is applicable to acidic phosphatic solutions ranging from phosphorous acid to monocalcium phosphate. The problems which attend the stabilization of acidic phosphatic solutions containing an excess of about 45% by weight of $P_2O_5$ is particularly acute and the invention finds important utility in the stabilization of such materials. Wet process phosphoric acid having a $P_2O_5$ weight concentration between about 52% and about 58% is effectively stabilized when using the chelating agent.

After the addition of the chelating agent, even though the acidic phosphatic solution is maintained quiescent, solids will settle only slowly out of the solution and, further, the amount of the solids precipitated will be considerably less than would be encountered in the absence of the chelating agent. In order to give a fuller understanding of the invention, but with no intention to be limited thereto, the following specific example is given.

EXAMPLE

The sodium salt of ethylenediamine tetraacetic acid, usually denominated sodium tetrine, was added to crude dilute (26% $P_2O_5$ by weight) wet process phosphoric acid to produce a solution containing 0.5% by weight of sodium tetrine. The dilute acid was then concentrated by boiling to approximately 54% $P_2O_5$. A control, without the addition of sodium tetrine, was also concentrated.

Each sample of the concentrated acid was permitted to settle for 24 hours at 150° F. and the percent solids by volume was measured. The clear acid was decanted and again permitted to settle over a five day period at 150° F. The volume of solids precipitated is given in the following table.

Table

| Sample | Initial 24 Hrs., Percent Solids By Vol- | Precipitated Solids By Volume Percent After— | | | |
|---|---|---|---|---|---|
| | | 1 Day | 2 Days | 3 Days | 5 Days |
| Control | 16.4 | 5.0 | 6.0 | 7.0 | 8.0 |
| 0.5% Sodium Tetrine | 5.95 | 0.5 | 1.0 | 2.0 | 2.5 |

These tests illustrate that the addition of a chelating agent reduces the amount of solids precipitated both immediately after concentration of the dilute wet process phosphoric acid and in the ensuing five days of settling.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A novel composition of matter in which the amount of solids precipitated is significantly decreased comprising an aqueous, inorganic, acidic, phosphatic solution selected from the group consisting of phosphoric acid and calcium phosphate solutions characterized by a $CaO/P_2O_5$ mole ratio of not more than about 1:1, said solution prepared from acidulated phosphate rock and containing suspended solid impurities, and a chelating agent capable of forming a metal complex at a pH below 7, said chelating agent present in an amount effective to substantially decrease the mount of solid impurities precipitated from said solution.

2. A process for reducing the amount of solids precipitated from an aqueous, inorganic, acidic, phosphatic solution selected from the group consisting of phosphoric acid and calcium phosphate solutions characterized by a $CaO/P_2O_5$ mole ratio of not more than about 1:1, said solution prepared from acidulated phosphate rock and containing suspended solid impurities, which comprises adding a chelating agent capable of forming a metal complex at a pH below 7 to said solution and agitating the mixture.

3. The novel composition of matter of claim 1 wherein said aqueous, inorganic, acidic, phosphatic solution comprises wet process phosphoric acid.

4. The novel composition of matter of claim 1 wherein said aqueous inorganic, acidic, phosphatic solution comprises a solution of monocalcium phosphate.

5. The novel composition of matter of claim 1 wherein said aqueous inorganic, acidic, phosphatic solution comprises a mixture of wet process phosphoric acid and monocalcium phosphate in solution.

6. The novel composition of matter of claim 1 wherein said chelating agent comprises an amino-polycarboxylic acid.

7. The novel composition of matter of claim 1 where said chelating agent comprises ethylene diamine tetraacetic acid.

8. The novel composition of matter of claim 1 wherein said chelating agent comprises tetrasodium ethylene diamine tetraacetic acid.

9. The novel composition of matter of claim 1 wherein said chelating agent is present in an amount within the range of from about 0.5 to about 50 pounds of chelating agent per ton of said phosphatic solution.

10. The novel composition of matter of claim 1 wherein said chelating agent is present in an amount within the range of from about 1 to about 30 pounds of chelating agent per ton of said phosphatic solution.

11. A process which comprises adding tetrasodium ethylene diamine tetraacetic acid to wet process phosphoric acid containing suspended solid impurities, said tetrasodium ethylene diamine tetraacetic acid added in an amount within the range of from about 0.5 to about 50 pounds per ton of wet process phosphoric acid, and agitating the mixture.

References Cited in the file of this patent

UNITED STATES PATENTS

| | | |
|---|---|---|
| 2,606,830 | Kamlet et al. | Aug. 12, 1952 |
| 2,770,538 | Vierling | Nov. 13, 1956 |
| 2,828,182 | Cheronis | Mar. 25, 1958 |
| 2,833,640 | Bersworth | May 6, 1958 |
| 2,955,919 | Wilson | Oct. 11, 1960 |